United States Patent [19]

Dow, Jr. et al.

[11] 4,319,128

[45] Mar. 9, 1982

[54] MICROPROCESSOR CONTROLLED DISPENSING METERING APPARATUS

[75] Inventors: John Dow, Jr., Rumson; William A. Oetting, Green Brook; Richard J. Yessian, Martinsville; Thomas J. Brady, Linden, all of N.J.

[73] Assignee: Lockheed Electronics Co., Inc., Plainfield, N.J.

[21] Appl. No.: 118,772

[22] Filed: Feb. 5, 1980

[51] Int. Cl.³ ........................ B67D 5/24; G06C 29/00; G06F 15/56

[52] U.S. Cl. ............................ 235/61 PD; 235/94 A; 235/58 P; 222/30; 222/76; 364/465

[58] Field of Search ............. 235/58 P, 61 M, 61 PD, 235/94 A, 31 T, 50 A, 61 PK; 364/424, 465, 479, 510; 222/30, 76

[56] References Cited

U.S. PATENT DOCUMENTS

| | | | |
|---|---|---|---|
| 3,254,749 | 6/1966 | Scherer | 364/465 X |
| 3,637,999 | 1/1972 | Pappas | 235/94 A |
| 3,765,567 | 10/1973 | Maiocco | 222/76 X |
| 3,814,148 | 6/1974 | Wostl | 364/465 X |
| 3,949,207 | 4/1976 | Savary et al. | 364/465 X |

*Primary Examiner*—Joseph W. Hartary
*Assistant Examiner*—Thomas H. Tarcza
*Attorney, Agent, or Firm*—Stephen B. Judlowe

[57] ABSTRACT

Microprocessor controlled flow metering apparatus employs mechanically coupled registers driven by a positive displacement or other flow meter to display fluid volume dispensed during a monitored transaction—and as a cumulative total over time. User adjustable electrical switch decades electrically enter computational scale factor variables such as price per gallon and tax rate.

The stored program controlled microprocessor computes all desired output variables (fuel cost, tax)—and outputs the variables in predesignated fields onto a printed ticket (invoice) while controlling printer carriage movement and solenoid actuation. In accordance with varying aspects of the invention, mechanical and software security is provided to ensure proper correlation between customer fluid (e.g., fuel) receipt and billing.

10 Claims, 15 Drawing Figures

RESET COUPLING

METER COUPLING

USER FLOW CHART

MICROPROCESSOR FLOW CHART

PRINT SUBROUTINE

MICROPROCESSOR CONTROLLED DISPENSING METERING APPARATUS

DISCLOSURE OF THE INVENTION

This invention relates to flow metering apparatus and, more particularly, to microprocessor controlled heating oil or other dispensed fluid metering apparatus for providing tamper-resistant printed and visual records of measured and derived flow parameters.

It is an object of the present invention to provide improved flow metering apparatus.

More specifically, it is an object of the present invention to provide stored program controlled flow metering apparatus which provides a printed record of measured fluid flow volume; and of derived parameters such as dispensed fluid cost and tax.

It is a further object of the instant invention to provide flow metering apparatus which is resistant to tampering and operator abuses.

Yet another object of the present invention is the provision of visual displays of the volume of fluid dispensed during any subject transaction; as well as an accumulated fluid volume over plural transactions.

The above and other objects of the present invention are realized in specific, illustrative microprocessor controlled flow metering apparatus which employs mechanically coupled registers driven by a positive displacement or other flow meter to display fluid volume dispensed during a monitored transaction—and as a cumulative total over time. User adjustable electrical switch decades electrically enter computational scale factor variables such as price per gallon and tax rate.

The stored program controlled microprocessor computes all desired output variables (fuel cost, tax)—and outputs the variables in predesignated fields onto a printed ticket (invoice) while controlling printer carriage movement and solenoid actuation. In accordance with varying aspects of the invention, mechanical and software security is provided to ensure proper correlation between customer fluid (e.g., fuel) receipt and invoicing.

The above and other features and advantages of the present invention will become more clear from the following detailed description of a specific illustrative embodiment thereof, presented hereinbelow in conjunction with the accompanying drawing, in which.

Figure 1:
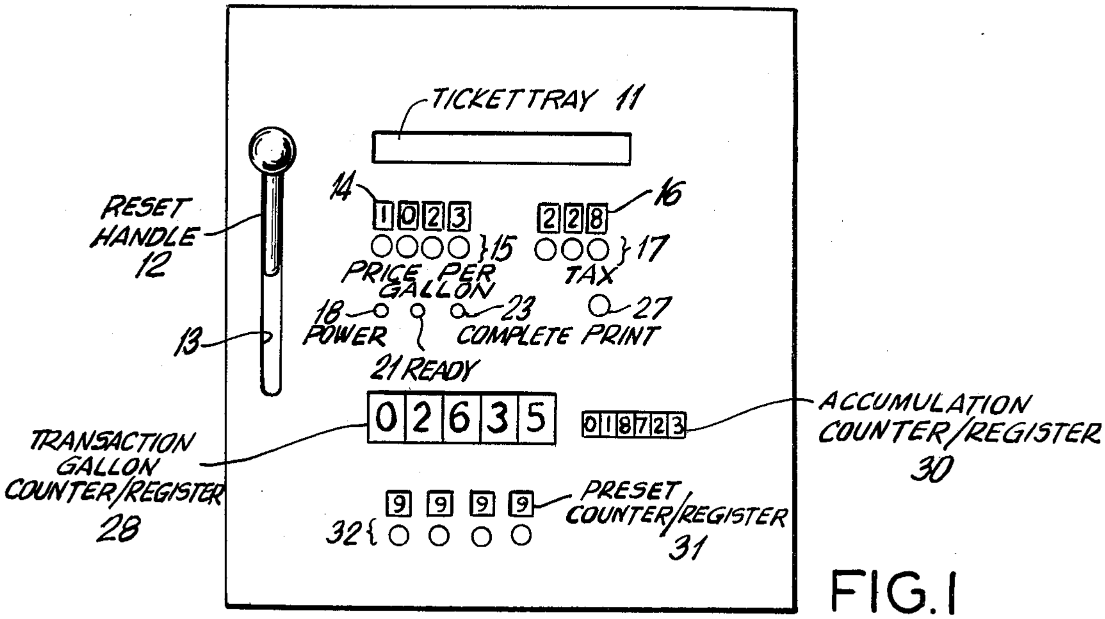
FIG. 1 is a schematic front view depicting the operator panel of improved microprocessor controlled metering apparatus embodying the principles of the present invention.

Referring now to FIG. 1, there is schematically shown the operator console panel 10 for microprocessor controlled fluid flow apparatus embodying the principles of the present invention. The composite meter includes a plural decade counter/register 28 for displaying the volume of product dispensed during any subject transaction. For concreteness and without loss of generality, it will be assumed that the metering apparatus of the subject invention is used for fuel metering—as on a home delivery oil truck for servicing customer locations. The register 28 is cleared to an all zero state prior to any transaction by the operator fully depressing a reset handle 12 through a slot 13 to its downward position, the handle 12 being restored to its upward quiescent position by spring and piston action. As fuel is being dispensed, the counter/register 28 is advanced mechanically to present a visual measure of the gallons of fuel dispensed, residing in a fixed state when the fuel delivery is completed. As is typical for such apparatus, the right decade of register 28 may denote tenths of a gallon, with digits in the second and more significant places being accorded their usual decade place values. An accumulation counter/register 30 is mechanically coupled to the counter/register 28 and accumulates the gallons of fuel dispensed over a number of transactions, for an extended period of time.

Figure 4:
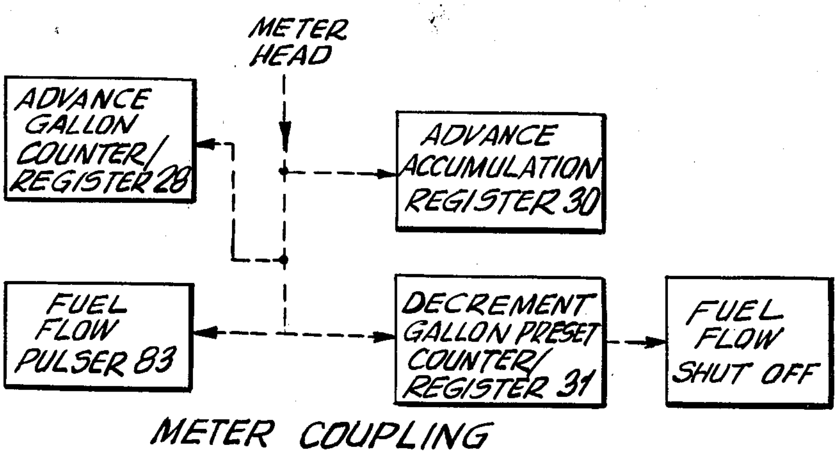

As indicated by the schematic mechanical diagram of FIG. 4, the counter/registers 28 and 30 are advanced by a rotating meter head of any type, and in any manner well known to those skilled in the art. See, for example, the disclosure in M. Pappas U.S. Pat. No. 3,637,999 issued Jan. 25, 1972, assigned to Lockheed Aircraft Corporation, the entire disclosure of which is hereby incorporated herein by reference. In brief, and as just one example, a positive displacement fuel metering structure may be included in the fuel flow line to rotate at a rate directly proportional to the fuel being dispensed. This mechanically engages a rotatable member within the composite metering apparatus of the instant invention which advances registers 28 and 30 (and decrement register 31 as below discussed) by any suitable mechanical coupling—e.g., a spur gear train.

The console 10 includes user adjustable price per gallon and tax rate electrical input registers 14 and 16, the decades of which may be independently adjustable by the meter user—as by conventional push button actuators 15 and 17. The individual decades of the registers 14 and 16, as is per se conventional, supply four bit BCD encoded electrical representations of the digital value characterizing the setting of each register switch decade. Similarly, the preset volume counter/register 31 may be preset by actuating individual decade controlling actuator buttons 32 to any particular volume of fuel desired for any delivery transaction. As the positive displacement meter head rotates and advances counter/registers 28 and 30, the counter/register 31 is coupled to the actuating gear train in a manner which decrements the stored count. When the count and counter 31 is decremented to zero, an output turns off a valve in the fuel delivery system terminating fuel delivery which thus has dispensed the desired quantity of fuel.

As additional user interfacing elements on the console of the subject composite metering apparatus, three visual indicators such as light emitting diodes or the like 18, 21 and 23 are respectively employed to signal when illuminated that power is supplied to the equipment (LED 18—"POWER"); that the equipment is conditioned for or in the process of performing a fuel delivery operation (LED 21—"READY"); and that any such transaction has been completed (LED 23—"COMPLETE"). A "print" push button switch 27 is used by the operator after fuel delivery is completed to generate the printed record of cost and the like.

Figure 11:
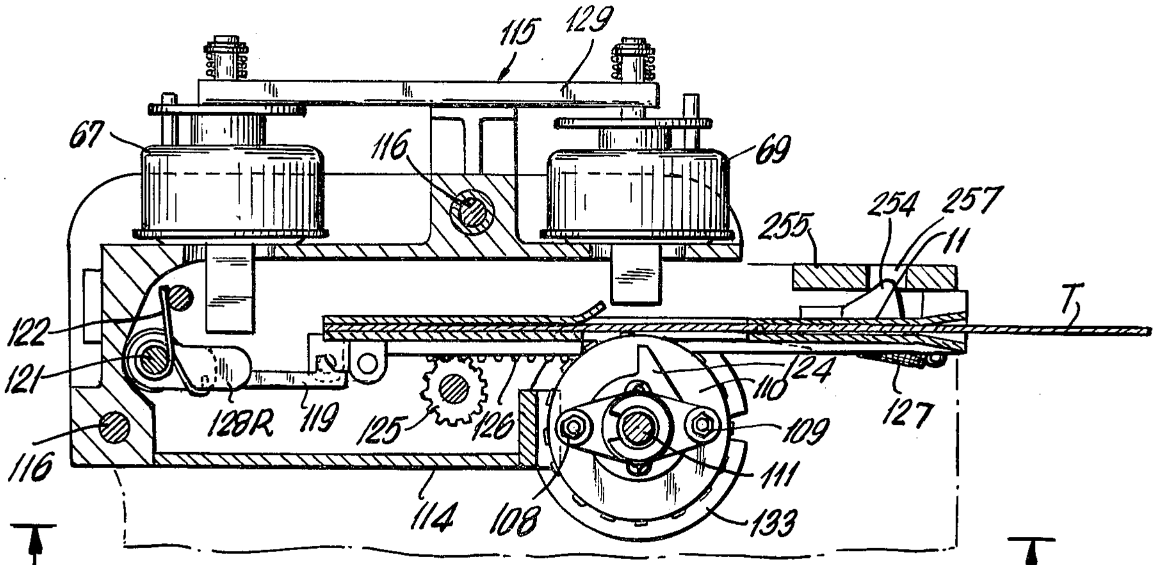
FIGS. 11–13 are partial side views depicting ticket tray 11 actuation and positioning at differing times during a complete cycle of operation.

Finally, a ticket tray 11 (schematically shown in FIG. 1—see FIGS. 11-13) is employed to receive a ticket or invoice T. When the reset handle 12 is depressed to begin a delivery operation, the ticket tray recedes into its rear-most position within the metering apparatus under action of a rack and pinion 125, 126 (FIG. 11 or 12), and fields of all zeroes are printed on the ticket in tray 11 for the volume, cost and tax fields in the specific manner set forth below. The transaction number (TRANNϕ) and price per gallon (PPG) information is printed for this zero line—as well as for final data printing. This first line assures both correct meter operation—and also that the customer will not be charged for fuel actually delivered elsewhere. In the manner hereinbelow described following zero field printing, the ticket tray is partially advanced in the forward direction to an intermediate position (FIG. 11). Following completion of a delivery transaction when the print switch 27 is actuated, a second line is printed on the ticket T in the tray with the "volume", "cost" and "tax" fields corresponding to the values for the amount of fuel delivered, scaled to reflect the price per gallon and tax amounts present in registers 14 and 16 at the inception of the transaction. When such data printing is completed, the tray automatically advances to its forward position (FIG. 14) where the fully imprinted ticket may be removed.

Figure 2:
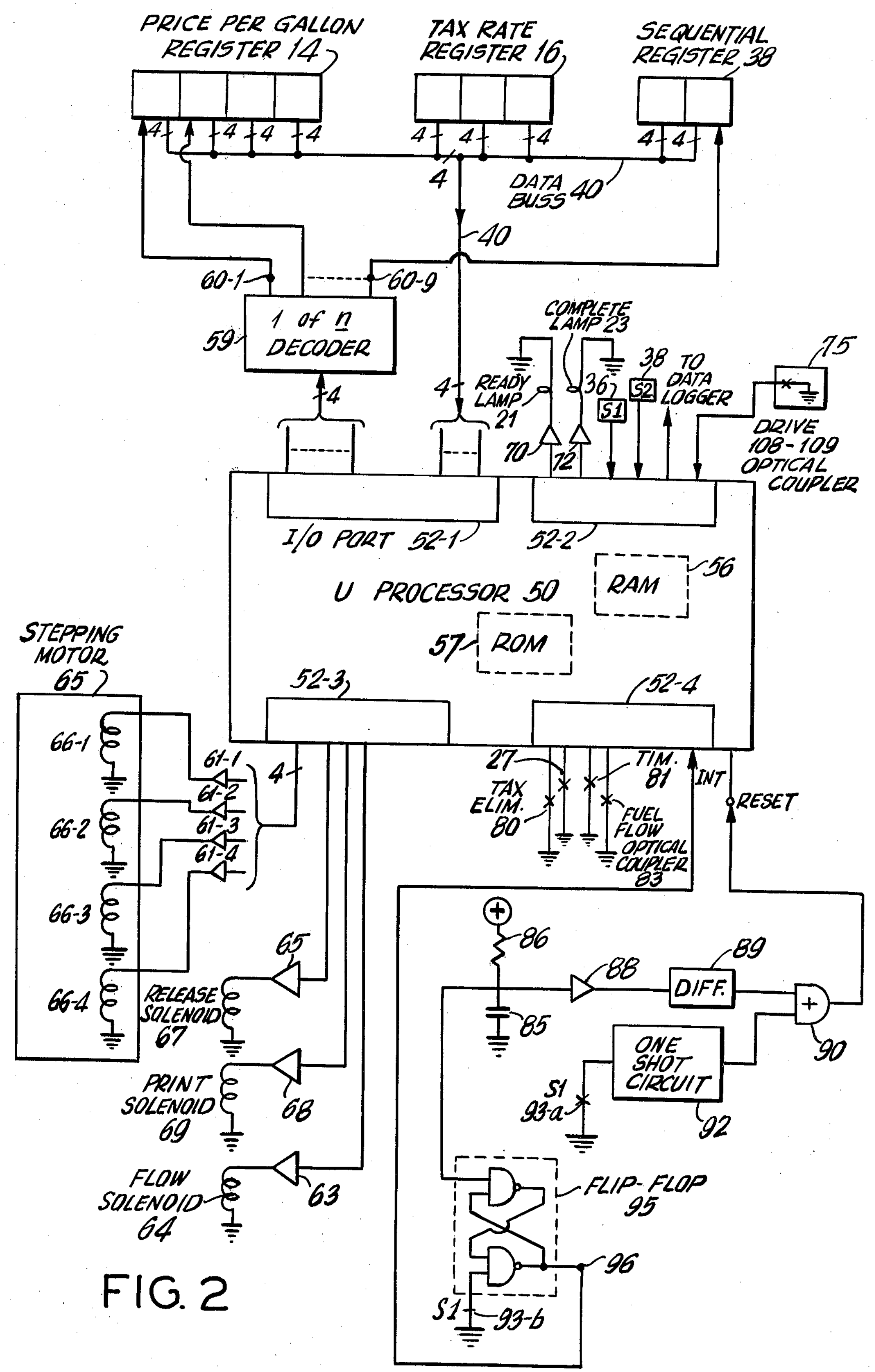
FIG. 2 is an electrical schematic diagram of the subject metering apparatus.

With the above brief functional description in mind with respect to mechanical and electrical input and output devices with which the user interfaces, attention is now directed to the electronic schematic diagram of the composite metering apparatus shown in FIG. 2. The ancillary host mechanical structure will be briefly reviewed below. A microprocessor 50 is utilized and may comprise any of such devices well known to those skilled in the art. The particular element 50 shown is of the type having four eight-bit input/output ports 52-1 through 52-4, as well as an internally contained read and write scratch pad memory 56 ("RAM") and instruction containing read only memory 57 ("ROM"). Such microprocessors are available from a number of manufacturers, e.g., Fairchild Instrument Corporation, Sunnyvale, California. It will be appreciated that any other microprocessor (or indeed digital computer) may be employed, e.g., those using external address and data buses, an external RAM, ROM, multiplexer and the like.

As one electronic operation required for the system, the values loaded by the user into the price per gallon and tax rate registers 14 and 16 must be read into RAM 56 memory as appropriate scaling factors for a transaction. To this end, one of the input/output ports, e.g., the port 52-1, has a four bit data bus 40 connected thereto, the bus 40 also being connected to each of the register 14 and 16 decades. It is assumed that each of the register 14 and 16 decades has an output of the tri-state type such that all may remain physically connected to the data bus 40, but only that decade selected by an active output 60-i of a one-of-n address decoder 59 will be operatively connected by the bus 40 to the four right input bit positions of the port 52-1. Accordingly, during the initial portion of the composite fuel delivery cycle of operation, the microprocessor 50 supplies a sequence of digital word patterns to the left four bits of the port 52-1 to sequentially actuate (poll) the individual stages of registers 14 and 16 (and also of register 38 discussed below). Thus, the output control leads 60-1, . . . , 60-9 of decoder 59 are sequentially enabled, one at a time, so that the four stages of the price per gallon register 14, three stages of the tax rate register 16, and two stages of the transaction number signalling register 38 are connected seriatim to the right four bits of the port 52-1 via bus 40 for storage in RAM 56 of microprocessor 50. In this way, the contents of registers 14, 16 and 38 are thus available in the memory 56 in the microprocessor 50 as computational variables.

The transaction numbering register 38 comprises a storage device providing an electronic BCD output (four lines per decade, e.g., for two decades), which provides to the microprocessor 50 via bus 40 in the manner above-described a serial number for each transaction. The serial number comprises a ready clerical and management tool for indexing, recording, and verifying fuel delivery. The transaction decades 38 may be sequenced in any manner well known to those skilled in the art. Thus, for example, they may be mechanically coupled to sense movement of the ticket tray 11 or to the reset handle 12 to index one position each time the handle 12 is depressed (or the tray 11 moves rearward) at the beginning of a new fuel delivery cycle. Alternatively, the registers 38 may be electro-mechanical counters which are indexed electronically at some early point of a cycle of operation.

The input/output port 52-3 of the microprocessor 50 is employed for various output control functions. The composite flow metering apparatus of the instant invention employs a stepping motor 65 having four phase actuating windings 66-1 through 66-4 for rotating longitudinal guide and drive 108 and 109 (FIG. 14) to traverse print wheel assembly 110 for printing purposes below discussed. The left four bit position of microprocessor input/output port 52-3 are employed to supply the square wave drive train to the stepping motor 65 windings 66 to advance the motor 65, and thereby also the drive 108, 109 and print wheel 110 coacting with fixed lead screw 111, in an appropriate direction, in an appropriate amount for the functional purposes below described in accordance with the stored program for the microprocessor 50. Intermediate amplifiers 61-1, . . . , 61-4 are utilized for power amplification, buffer purposes. Gears 104, 105 and 106 (FIGS. 14 and 15) connect the motor 65 with the drive rods 108, 109.

The remaining two outputs of input/output port 52-3 are employed to selectively energize a print tray release solenoid 67 via a buffer amplifier 65 for purposes below described (in brief, to cycle the invoice T containing tray 11 between its three positions); and to selectively actuate a print solenoid 69 through a buffer amplifier 68 to cause a solenoid 69 hammer to strike the invoice ticket thus effecting printing, again in the manner below described.

Shown connected to the input/output port 52-2 of the microprocessor 50 is a buffer amplifier 70 which turns the "READY" light emitting diode 21 (FIG. 1) on or off depending upon whether or not a one or zero is stored by the microprocessor 50 in the corresponding port digit location. Similarly, the "CφMPLETE" lamp 23 is turned on or off by a buffer amplifier 72 depending upon the contents of a second bit position in the port 52-2.

As above described, the ticket containing tray 11 (FIGS. 11-13) resides in one of three positions, viz., its rear-most position in the zero line printing position (FIG. 12); an intermediate position for data printing (FIG. 13); and a forward position (FIG. 11) for ticket insertion and removal. Two electrical sensors, e.g., microswitches S1 and S2 (FIG. 2) are employed to sense the status of an invoice T-loaded invoice tray 11. These microswitch sensors may sense the tray 11 position in any manner well known to those skilled in the art, as by having sensors protrude into the traversal path for the invoice in the ticket tray 11 frame to open or close in a pattern providing outputs indicative of the ticket tray position. For concreteness and without limitation or generality, it will be assumed that the switch S1 is actuated when the tray 11 is in its rear-most or intermediate positions, while the switch S2 is actuated only when the tray 11 reposes in the fully inserted (FIG. 12) position. It will further be assumed that the microswitch sensors protrude through apertures or slots in tray 11 to thus be actuated only if an invoice T is being conveyed by the tray. Normally open contacts 36 and 38 of the switches S1 and S2 are further input variables to the microprocessor 50 input/output port 52-2 to report tray 11 positioning.

Further with respect to the port 52-2, the print wheel rotating drive 108-109 (see, for example, FIG. 14) has at one end thereof a shaft rotational sensing element 75 (FIG. 2), e.g., a simple disc 133 (FIGS. 14 or 15) fixed for rotation with elements 108-109 and which have at least one peripheral notch or aperture which rotates between a light source and a light detecting photodiode or the like. Accordingly, as the print wheel drive 108-109 rotates and, with it, the optical path interrupting disc, pulses are supplied by the composite drive optical coupler 75 and conveyed to the right most input position for microprocessor port 52-2. Port 52-2 is also shown as having an output digit connected to a data logger or other recorder, if desired, to provide a communications path for any information recording device. Examples of such recording devices may be a magnetic recorder, a printer, or a modem for transmitting information to a common point such as a central office location. Such data recorders serve as a management tool; and as an additional security device to assure tamper-free fuel delivery.

The microprocessor 50 input/output port 52-4 receives several input variables. Manually operated form A switch contacts 80 signal the microprocessor whether or not tax is appropriate for a subject delivery transaction. Thus, for a non-tax paying entity, the tax computation, and its contribution towards the gross transaction sales price, will be suppressed. The switch 27 is connected as an input signal to the port 52-4. Switch contacts 81 signal whether or not an automatic time-out is desired to terminate transaction printing if the transaction is consuming excess time. This, again, is a veracity enhancing device to prevent fuel flow from occurring at two different locations with the attendant requirement that an excessive amount of time vis-a-vis that normally attendant a fuel delivery operation has occurred. A fuel flow optical coupler 83 supplies a train of pulses to signal the quantity of fuel being delivered during a transaction. See again the above-identified earlier patent. The coupler 83 may simply comprise an optical coupler connected to a rotating vane of a positive displacement fuel meter such that a disc with peripheral apertures opens and closes a light path between a light source and light sensor at a rate proportional to the fuel flow actually being delivered to the customer.

Figure 12:
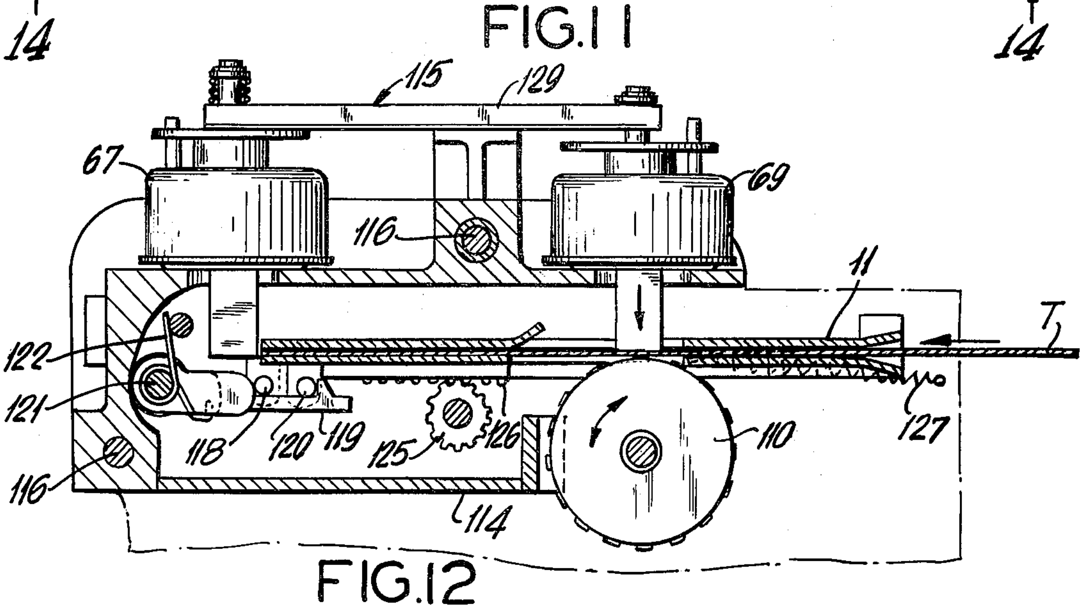

The circuitry in the lower right of the FIG. 2 schematic is employed to energize a RESET microprocessor interrupt port either when a power-up occurs to condition the microprocessor to its initialized reset state; or when the switch S1 is actuated as a ticket T in the tray 11 is inserted to its active, fully inserted position (FIG. 12). To this end, a voltage across a capacitor 85 goes high when power is first applied, and this is coupled through a buffer amplifier 88, a differentiator 89, and an OR gate 90 to the RESET microprocessor input terminal when power is first applied. Similarly, actuation of contacts 93-*a* of switch S1 on ticket insertion energizes the RESET input port via a monostable, one shot circuit 92 and the OR gate 90.

A flip-flop 95 is employed to provide an input interrupt (INT) signal when a ticket is in an active (i.e., inserted) position in the meter and power comes on—one of the situations of possible delivery abuse. To this end, a normally closed contact 93-*b* of switch S1 will maintain flip-flop 95 output terminal 96 high (Boolean) on power-up. However, the voltage at terminal 96 will go low signalling a fault or error condition if there is a power-on situation (low-to-high Boolean variable at the upper input of the upper NAND gate of flip-flop 95) at a time when the switch S1 contacts 93-*b* are open, indicating that a ticket T is in a recessed position.

That completes the general, functional identification of the several elements of the composite meter apparatus of the instant invention. A further discussion will now be had with respect to the overall operation of the equipment in conjunction with FIG. 5, which is a functional presentation in flow chart form of the interaction between a user of the apparatus, and the equipment. A flow chart for the particular stored program reposing in ROM 57 of the microprocessor 50 is shown in FIG. 6 (in its entirety) and in FIG. 7 (a PRINT subroutine for the FIG. 6 flow chart). The mechanical action of the invoice to that printing apparatus will also more fully be developed below.

Figure 5:
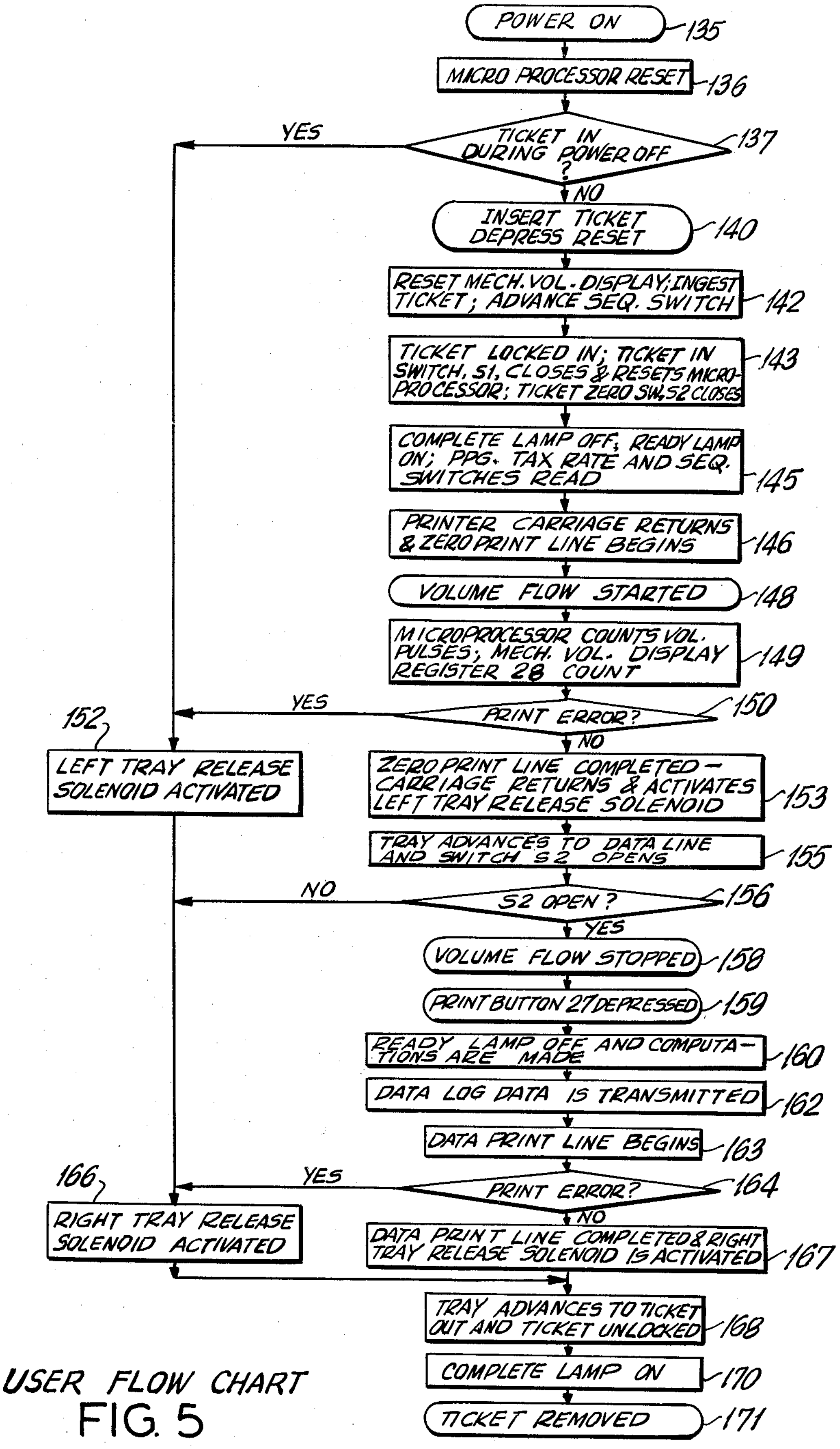
FIG. 5 is a user flow chart depicting operation of the subject metering apparatus vis-a-vis interaction by a user-attendant.
Figure 6:
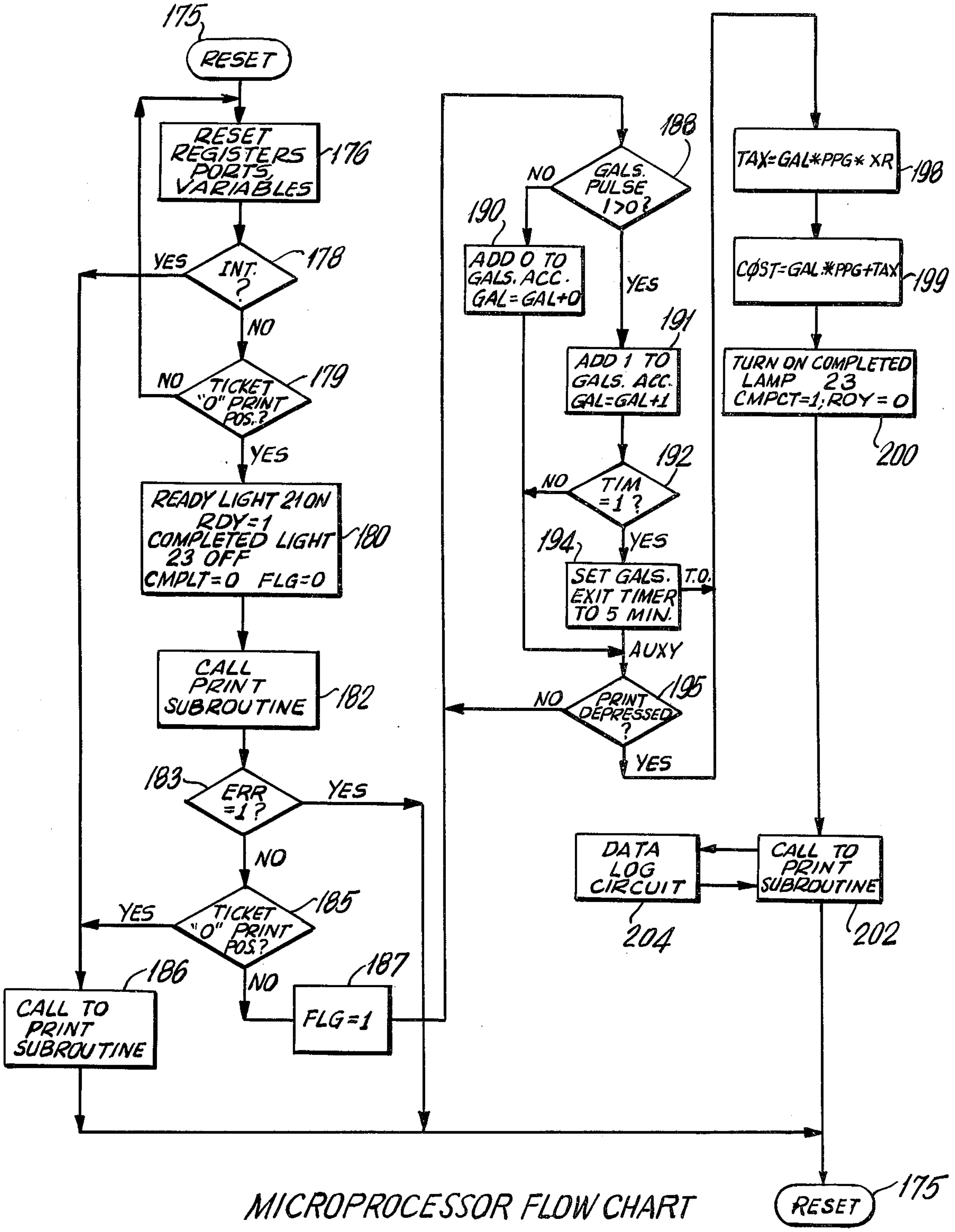
FIG. 6 is a program flow chart characterizing operation of a microprocessor 50 controlling the subject fluid flow meter.

Turning now to the functional, overall operational schematic flow chart of FIG. 5, electrical power for the meter is turned on (functional block 135, the functional blocks hereafter simply being indicated by their reference numeral), and the microprocessor reset in one of the two paths via OR gate 90 (136). If a ticket T is already in an active position in the tray 11 when power came on (a fault condition), test 137 provides an exit path ("YES") for clearing the device and for not enabling fuel dispensing. A transaction will not be permitted under this (or any other) fault condition until the device has been fully cleared and the reset handle 12 actuated as a new transaction for the protection of the consumer.

Figure 3:
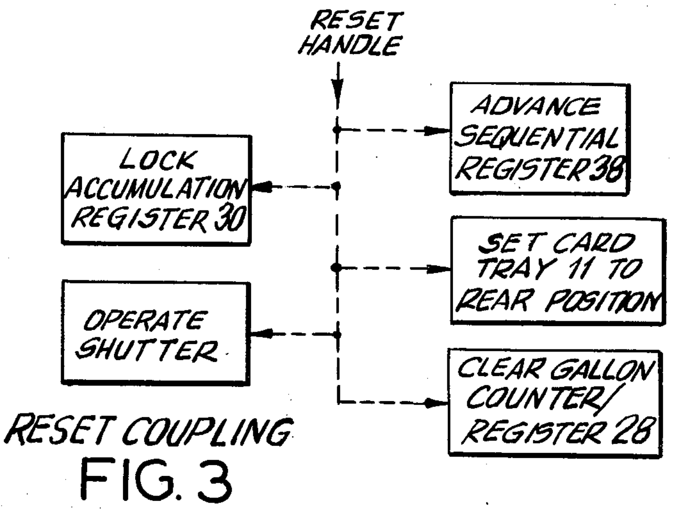
FIGS. 3 and 4 are mechanical actuation diagrams schematically depicting system responses to reset handle 12 actuation (FIG. 3) and to meter head rotation (FIG. 4)

Assuming as is the usual case that there was no ticket in the tray during an unpowered condition ("NO" output of test 137), a ticket T is inserted in the tray 11 and the reset handle 12 depressed, and permitted to return under action of piston 250 and spring 252 (140). The resulting several mechanical actions from reset handle 12 activation are depicted in FIG. 3. In brief, the sequential transaction register 38 (FIG. 2) is advanced to its next count position; the ticket T bearing tray 11 moved to its rear-most position (FIG. 12); and the dispensed gallon mechanical register 28 is cleared (142) with intermediate register 28 visual blanking via a shutter. With the tray in this position, the ticket T is mechanically secured; the switches S1 and S2 are actuated to signal this ticket condition and to also reset the microprocessor 50; and switch S2 is activated (143). Further, with the apparatus in such a state, the COMPLETE lamp 23 and READY lamp 21 are turned off and on, respectively; and the price per gallon, tax rate and sequential registers 14, 16 and 38 are read into RAM memory 56 of the microprocessor 50 (145).

At this point in operation of the composite meter, an initialized, all zero (data) first line of printing is effected by the printing apparatus hereinbelow described on the ticket T, which resides in the rearward position as above described (146). For the zero printing line, the transaction number (TRANNϕ) of register 38 is printed in a field therefor; and an array of all zero digits are printed in the "cost" and "tax" fields of the ticket since for proper operation there should obviously have been no fuel dispensed at this initialized point in proceedings.

Figure 14:
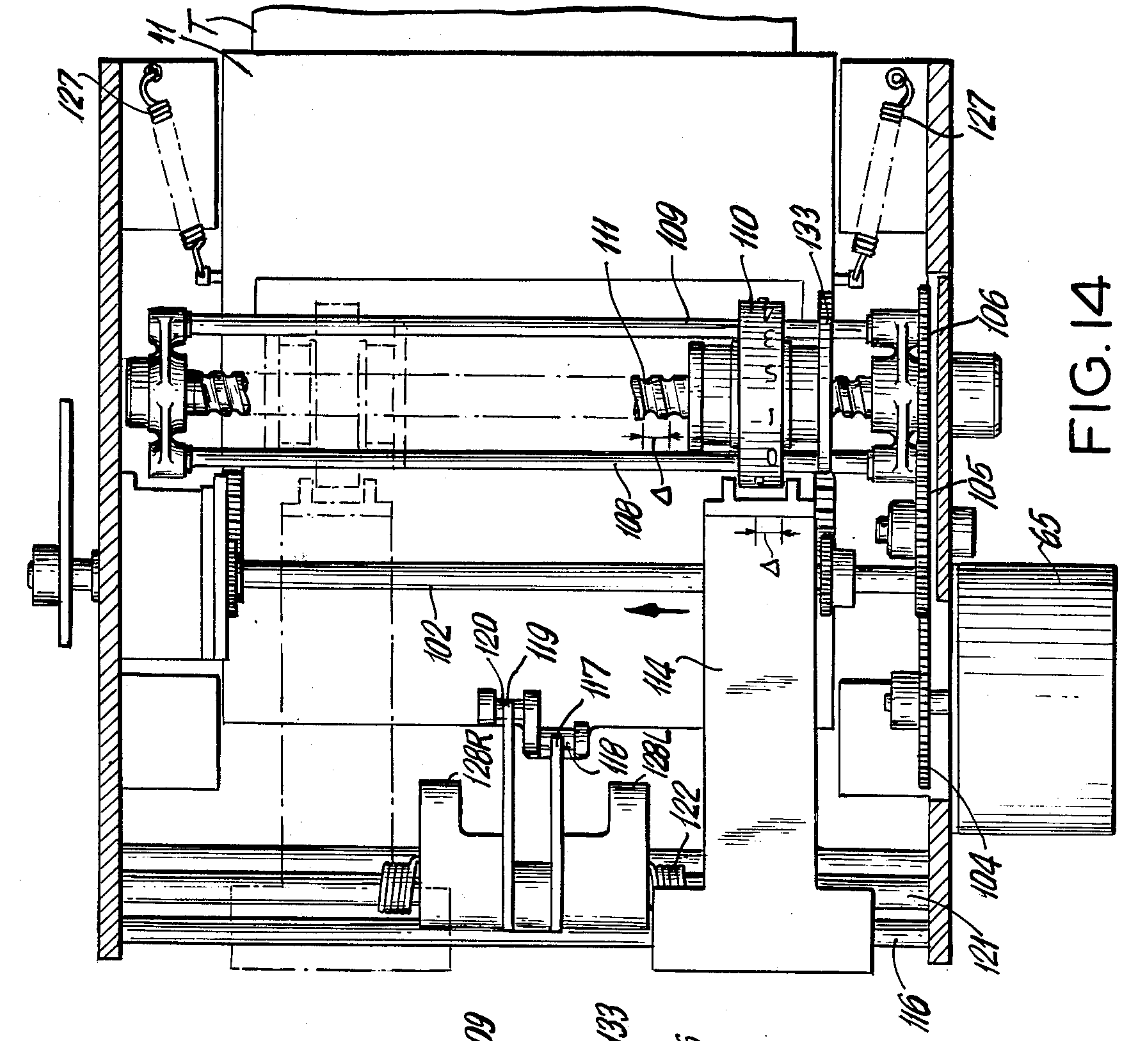
FIG. 14 is a top partial view detailing the print wheel, its carriage and ancillary elements thereto.
Figure 15:
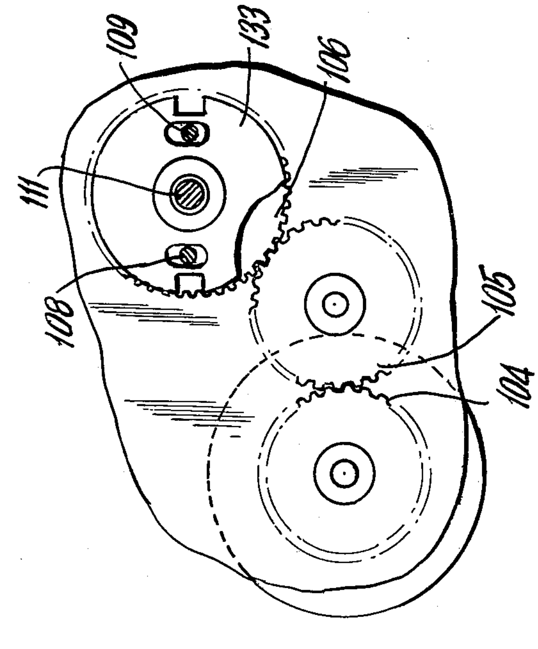
FIG. 15 depicts the drive coupling train for the print wheel carriage of FIG. 14.

To characterize printing operations, the longitudinal guide and drive bars 108 and 109 are rotated in a first direction by microprocessor 50 which issues actuating pulses to the stepping motor 65 windings 66-1 through 66-4 by way of buffer amplifiers 61-1 through 61-4. The energized motor 65 accordingly rotates the longitudinal drive via gearing 104, 105, 106 shown in FIGS. 14 and 15. The drive bars 108 and 109 pass through apertures in the print wheel 110, the print wheel assembly having an internal thread which cooperates with fixed lead screw 111 (FIG. 14). Accordingly, as the drive 108, 109 rotates, and with it print wheel 110, the composite wheel 110 axially moves along the lead screw 111—in this case to the extreme left (the view of FIG. 14 or front view of the equipment) until it can move no further, i.e., when an arm 124 (FIG. 11) reaches an obstruction on the left portion of the frame of the unit. As the drive rotates, a shaft position encoder 75—most simply disc 133 having circumferential apertures which pass between a photosource and photodiode, of an optical coupler, reports the position of the drive 108, 109 and print wheel 110 when the circumferential apertures unblock the path between the light source and photodetectors. This information is communicated to the microprocessor 50 via the coupler 75 (FIG. 2). The left most position of the wheel 110 passed the left margin of the left most printing field on ticket T may thus be known to the microprocessor 50 by the microprocessor maintaining a running tabulation of wheel 110 axial, longitudinal position by counting pulses. More readily, however, the unit may simply drive wheel 110 to its left-most, blocked position which may be sensed by ineffective drive pulses supplied by the microprocessor port 52-3, i.e., pulses which do not obviate a continued stream of unobstructed light reception level information supplied by coupler 75 which will occur if an aperture on wheel 133 is disposed between the photodiode and detector when the wheel 110 is blocked via its blocking projection 124.

Also disposed for axial translation with the print wheel assembly 110 is a carriage 115 which includes a print hammer solenoid 69 and a tray 11 release solenoid 67. The frame 115 translates via shafts 116, and is driven by gearing coupled to the drive 108, 109 to rotate therewith. Alternatively, the carriage 115 and the functional elements conveyed thereby may be mechanically coupled directly to the print wheel assembly 110.

After driving the print wheel 110 and carriage 115 to its left-most position beyond the left-most data field of ticket T, the microprocessor 50 upon sensing this activates the stepping motor 65 in a second or opposite direction, thereby moving the print wheel 110 and carriage 115 to the right in FIG. 14.

It will be observed that the printing solenoid 69 reposes directly over the print wheel 110 and maintains this orientation as both of the assemblies 115 and 110 axially translate in the composite printing apparatus (FIGS. 11-14). As the assemblies 115 and 110 move from left to right, they pass over each digit position in the zero line of the ticket in each of the "transaction number" "cost" and "tax" printing fields. As they pass through each digit position in each of these fields, the microprocessor 50 supplies a print solenoid 69 actuating signal via amplifier 68 (FIG. 2) when the appropriate number to be printed on the outer circumferential of wheel 110 then resides beneath the solenoid hammer. See FIG. 12 for such an energized solenoid 69 condition. Further, the numerals are positioned on a circumferential diagonal of the print wheel 110—the numerals being skewed to offset the pitch of lead screw 111. Accordingly, each digit on the surface of wheel 110 will occur at the center of each digit printing position.

The ticket T is advantageously of the self-enabling kind, i.e., creates a visible image on all invoice copies corresponding to the impression of the digit on the engaging surface of wheel 110 at the time the character is struck by the solenoid 69 hammer. Various forms of such self-impression paper are well known to those skilled in the art. The microprocessor 50 knows when to issue the print command by simply counting the stepping motor 65 energizing pulses from a reference state of the print wheel 110, as signalled by the shaft encoder optical coupler 75 pulses. Since the initial data to be printed, that is, the initial contents of RAM 56 registers TAX and CϕST are all zeroes while the transaction number variable TRANNϕ is loaded with the contents of sequential register 38, this information is printed on the ticket in each position for the respective transaction number, tax, and cost fields of the ticket T. This action continues until the print wheel 110 and the carriage 115 is beyond the right most edge of the right most active print field on the ticket T.

Figure 13:
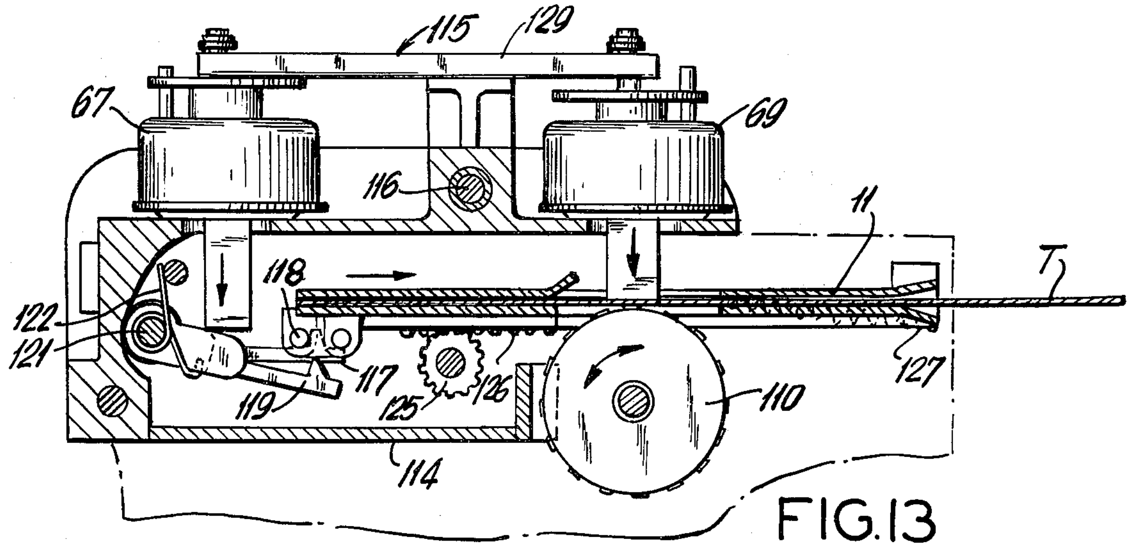

Following this, the motor 65 reverses direction under control of the microprocessor, again driving the print wheel assembly 110 and carriage 115 to the left. It will be noted that the ticket tray assembly 11 includes a rear projection 120 which is engaged by and retained by an arm and finger 119 upwardly spring biased by spring 122 operative around the shaft 121 (FIG. 12). As the carriage 115 is driven to the left, there obtains a point when the tray release solenoid 67 hammer reposes above a surface 128L (left) connected to the arm and finger 119. At this time, the microprocessor 50 (again, knowledgeable about the positioning of carriage 115 by counting motor 65 energizing pulses) energizes the release solenoid 67 via buffer amplifier 65 and microprocessor output port 52-3. When this occurs, arm and finger 119 is rotated downward against the spring bias of an extended spring 122, thereby releasing the tray 11 to move forward under urging of a bias spring 127. The tray 11 moves forward until a second rear projection 118 is engaged by a second biased, pivoting arm and finger 117 (FIG. 13). With this condition obtaining, the ticket tray is secured in its intermediate position (FIG. 13) such that the print wheel 110 and print solenoid 69 will trace across a second (lower) line on the invoice T when the print wheel 110 and frame 115 next axially translates along the ticket after a delivery operation has been completed, and when the actual cost and tax amounts associated with that delivery have been computed and are to be imprinted on the invoice T and furnished to the customer.

Following the first actuation of the release solenoid 67 and with the tray in its intermediate position of FIG. 13, the frame 115 and print wheel 110 continue to their left most, mechanically blocked position to await the next printing operation after fuel dispensing is complete. As anticipated above, the above-described printing operation is essentially repeated following completion of fuel delivery (CφMPLETE lamp 23 illuminated by microprocessor 50) and after the operator has depressed the print switch 27. During this operation, the CφST and TAX registers in RAM memory 56 of course have data contained therein. Thus the actual measured information is outputted rather than the fields of all zeroes as was the case for the initial or clear printing line. Other than the data, the only change during this final or active printing cycle is that the release solenoid 67 is actuated when the solenoid hammer reposes over surface 128R (right) for releasing retaining arm and finger 118 vis-a-vis elements 128L and 119 as was formerly the case. When the retaining arm finger 118 is released, the ticket tray 11 and ticket T are pulled completely forward under action of the extended spring 127 to their fully extended position (FIG. 11) so that the fully imprinted ticket T may simply be extracted from tray 11. It is to be understood that when a line of printing is described as an operation below, all of the above-described functions and mechanical and electronic coaction in fact occur.

Returning to the user-equipment interactive flow chart of FIG. 5, the printing operations are shown at functional blocks 150, 153, 155 and 156. The description associated with each functional block is presented in the drawing and correlates with that above-described. By way of brief further explanation, test 150 causes an exit ("YES" test response) from computer functioning if something is internally wrong with the printing apparatus itself. Similarly, test 156 creates an interrupt exit ("Nφ" test response) if the switch S2 has not opened to signify that the ticket tray has in fact reached its intermediate (FIG. 13) position. It is observed at that point that the error system functioning exits of FIG. 5 (the left column with functional blocks 152 and 156) simply clear the printer apparatus by causing solenoid 67 to actuate the release arms 117 and 119 to clear the device so that a new and proper sequence of operation may occur. Finally, it is observed that the fuel dispensing operation is started (functional block 148 corresponding to microprocessor 50 actuating a fuel flow enabling valve relay 64 via amplifier 63—FIG. 2) even before the zero printing line is completed for time conserving purposes. To this end, the initially cleared CφST and TAX initial zero values are transferred to buffer output registers before fuel dispensing begins to preserve their value during printing. Similarly, the microprocessor counts fuel delivery metering pulses from the fuel flow optical coupler 83 as fuel is being dispensed, count is internally stored in a RAM 56 storage variable GAL. In a parallel manner, the fuel being dispensed mechanically augments the register 28.

After the desired fuel volume has been stopped as by the attendant terminating fuel dispensing by manual valve control (158), the operator actuates print button 27 (159). This causes the READY lamp 21 to be turned off and the CφMPLETE lamp 23 turned on, and the desired economic values computed. To this end, tax (TAX) is computed by multiplying the volume of fuel dispensed (GAL) by the price per gallon (PPG) and also by the tax rate (TXR). The computational RAM variables are given in the immediately preceding sentence. As above noted, the price per gallon (PPG) and tax rate (TXR) contents of the computational variables, of course, correspond to the contents of registers 14 and 16 read into RAM memory 56 during operation 145 above discussed.

Finally, the data is outputted to the data logger if used (162) and output printing occurs for the active data line—functional blocks 163, 164, 167 and 168. The respective functions performed during this final or active printing line are as above discussed. For final, data printing it is the arm and finger 117 which is actuated at state 167 to completely release the tray 11 to its forward most, extended position (FIG. 11)—(168). Finally, the CφMPLETE lamp 23 is turned on (170) and the invoice T is removed (171) to complete the transaction.

It is again noted that the schematic flow chart of FIG. 5 typifies user-equipment interaction. The largely comparable flow chart which characterizes the apparatus controlling program stored in read only (ROM) memory 57 is depicted in FIG. 6 with the PRINT subroutine shown in FIG. 7. The FIG. 6–7 stored program of course is largely duplicative of the interaction FIG. 5 sequence, and thus will be described only briefly. From an initial reset state (175) all computational variables and microprocessor input/output ports are reset as an initialization matter (176) and the interrupt (INT) input signal to port 52-4 of microprocessor 50 examined to determine whether a fault condition has occurred (178). If so ("YES" output of test 178) the PRINT subroutine (FIG. 7) is called (186) to assure that the printer and tray 11 are released by releasing both of the fingers 117 and 119 (a functional path comprising FIG. 7 flow chart elements 208, 209 (an error register ERR variable being set to one upon a fault condition) and 220 which activates the release solenoid 67 twice to strike both of the elements 128L and 128R).

In the normal case where there is no fault ("Nφ" output of test 178 at test 179 of FIG. 6), processing next asks whether or not a ticket has been inserted in the tray 11 and the tray inserted in its rear-most FIG. 12 position under action of a user-depressed handle 12. Where the handle 12 has not yet been depressed with the ticket T in place, the processor simply remains in a waiting state, looping between operations 176, 178 and 179, 176 . . . until the loaded tray 11 has been recessed into the equipment ("YES" output of test 179). At this point, the READY light 21 is turned on by the microprocessor loading a one into a RDY digit which controls the digit position in microprocessor output port 52-2 connected to amplifier 70 (180). Similarly, the CφMPLETE light 23 is turned off by setting a CMPLT variable equal to zero. Further, a flag (FLG) bit in RAM 56 is set equal to zero for printer control purposes to signal to the printer that the next printing cycle will be a zero cycle rather than an active cycle. See in this regard, test 219 in the PRINT subroutine (FIG. 7) which releases only the left latch (119)—functional block 221, when the flag bit (FLG) equals zero for a zero line printing operation. Correspondingly, block 222 is selected to release the right latch 117 during a data outputting operation. After any one of the PRINT subroutine operations 220, 221 or 222 is completed (and one of the three is always exercised for each PRINT subroutine iteration), the PRINT subroutine returns to the main processor flow chart of FIG. 6. Returning to FIG. 6, following block 180 the PRINT subroutine is called and executes a zero printing line in the manner described above (182). If some kind of internal printing error occurred ("YES" result of test 183) or if after completion of the zero line printing the tray is still incorrectly in its rear-most (FIG. 12) position ("YES" output of test 185), the operative cycle ends and control passes to the reset, waiting state 175. For the latter case ("YES" output of test 185) the PRINT subroutine is called once again to clear both of the releases 117 and 119 to assure release of ticket tray 11.

Again assuming as is the normal case, that the zero line was correctly printed and that proper functioning in fact occurred to release the ticket tray 11 to its intermediate position (FIG. 13), the flag bit is set to "1" (187) to thereafter communicate when the PRINT subroutine is next called, that it is executing a final and not an initial printing operation.

Following the zero line printing above discussed, the equipment simply counts fuel flow pulses to accumulate the gallonage of fuel dispensed. To this end, test 188 simply looks for a level transition at the RAM input port 52-4 associated with the fuel flow optical coupler 83. Each time such a transition in the binary level therepresent occurs, indicating that a fixed increment of fuel was dispensed, the gallonage accumulating register is incremented by one (191). In typical computer language, this may be expressed as GAL=GAL+1. The gallon register of course contains information accurate to a tenth of a gallon. In a typical situation a scaling factor is applied since typically more than one pulse will be required to signal the tenth of a gallon unit. Also, following the gallonage update (191), a test 192 will be examined to see if a time-out mode is desired (TIM=1) by examining switch 81. If so, an internally maintained clock is reset each iteration. If an excessive time has elapsed since the last iteration, functional block 194 issues a time-out (T.O.) signal to cause data dumping (i.e., data printing) irrespective of the fact that the print button 27 has not been depressed. This prevents an attendant from moving a vehicle without terminating a transaction; a potential abuse condition where an operator can increase the bill of a customer while delivering fuel elsewhere. Assuming that there is no time-out, and that the delivery cycle has not been completed (i.e., the switch 27 has not been actuated), the flow chart operations above-described (188 through 195) keep looping, updating the gallons (GAL) register as additional fuel is sensed. As one aspect to this, where there is no transition in the state of the optical coupler 83 to microprocessor port 52-4, i.e., since the input port is polled much more quickly than the fuel is dispensed to assure that all data is collected, a "NΦ" output of test 188 simply causes a non-productive zero to be added to the contents of the gallon variable (GAL) and the system operation then moves back to reexamine the coupler 83 state after test 195 fails ("NΦ"). This non-productive exercise is undertaken simply to slow down the computational path 188, 190 and 195. This conforms to computer practice of making the two parallel loops 188, 190 and 195 vis-a-vis 188, 191, 192, 194, 195 more comparable is consumed execution time.

Eventually there comes a point where the transaction is complete and the print switch 27 depressed. At this point, test 195 will be satisfied ("YES" output of test 195). Following this, the tax (TAX) and transaction cost (CΦST) variables are computed as TAX=GAL*PPG*TXR, and CΦST=GAL*PPG+TAX (198, 199). The CΦMPLETE lamp 23 is turned on by setting the variable CMPLT equal to one and the READY lamp 21 turned off by setting RDY equal to zero (200).

Finally, the PRINT subroutine is again called (202) to execute the final, active printing line in the manner above discussed, also supplying the output information for data logging purposes to the appropriate digit position in microprocessor 50 output port 52-2 (204). The PRINT subroutine of FIG. 7 for this iteration executes carriage release 222 since the flag bit has been set to one ("NΦ" output of test 219). Following this, the entire cycle is completed and reposes at its reset condition 175 to await a new delivery cycle of operation.

Figure 7:
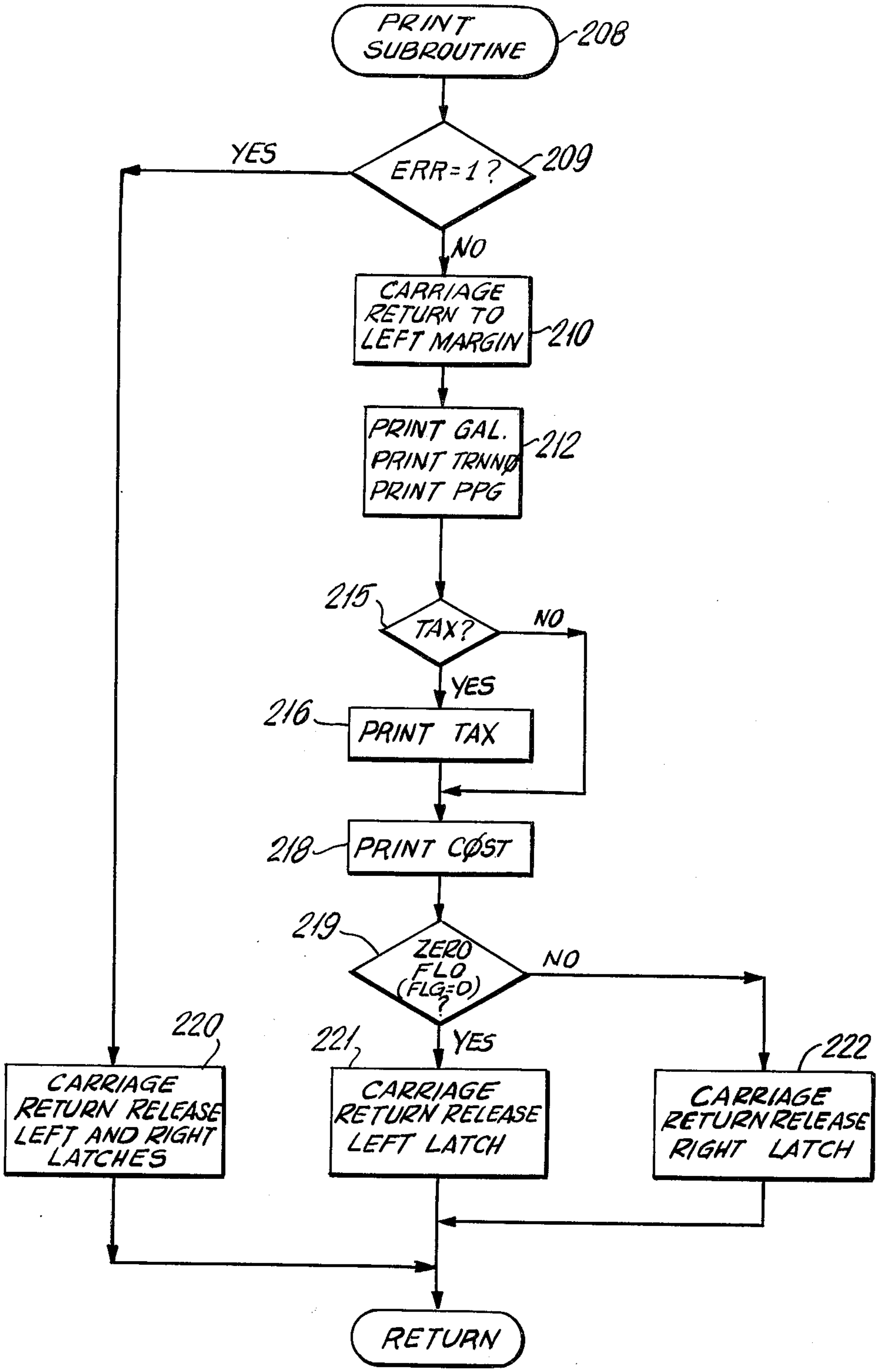
FIG. 7 is a flow chart of a PRINT subroutine for the overall flow chart of FIG. 6.
Figure 8:
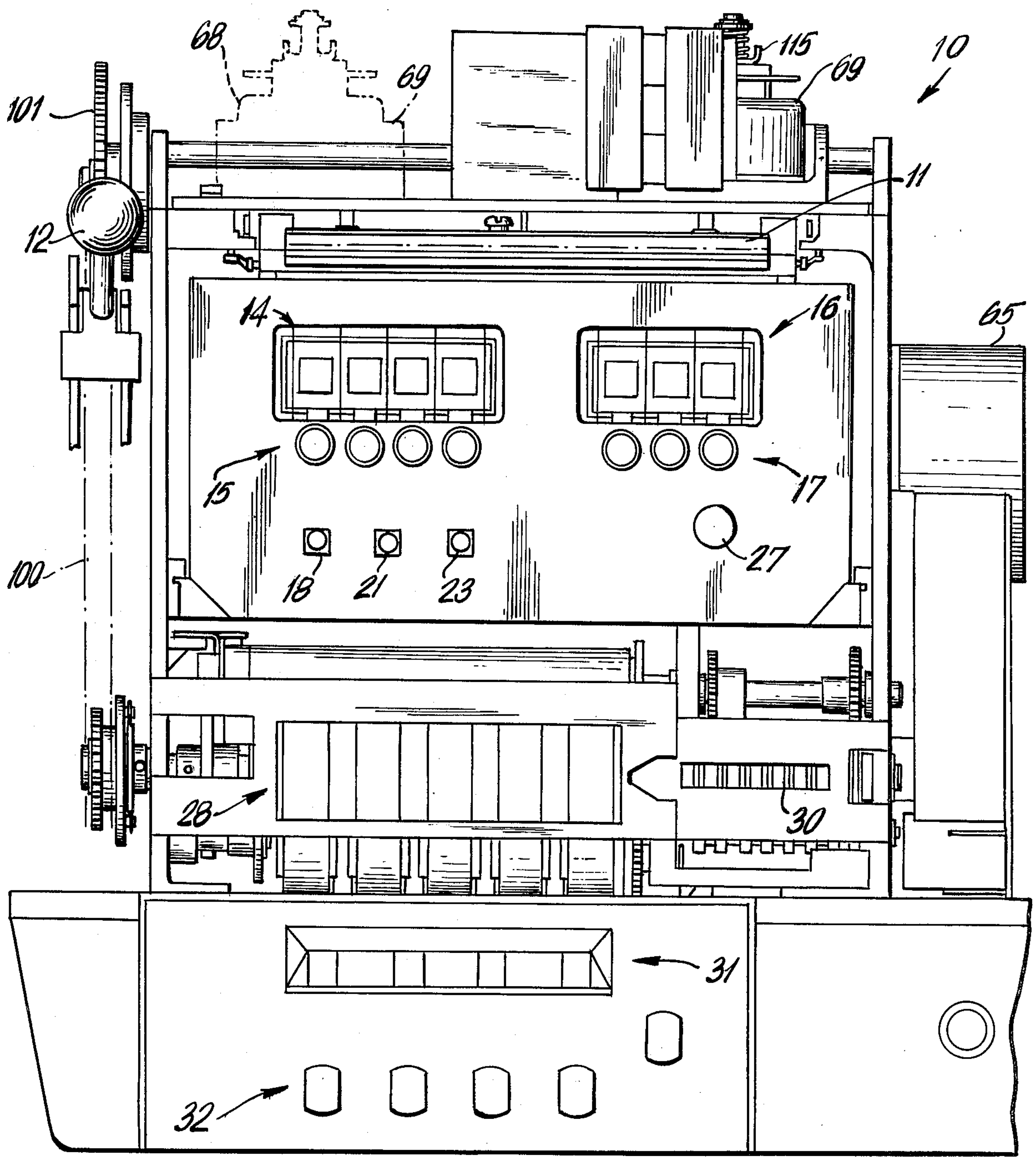
FIGS. 8, 9 and 10 are partial front elevation, top plan and side views of a printer and printer carriage controlling and actuating apparatus for the subject composite meter apparatus.
Figure 9:
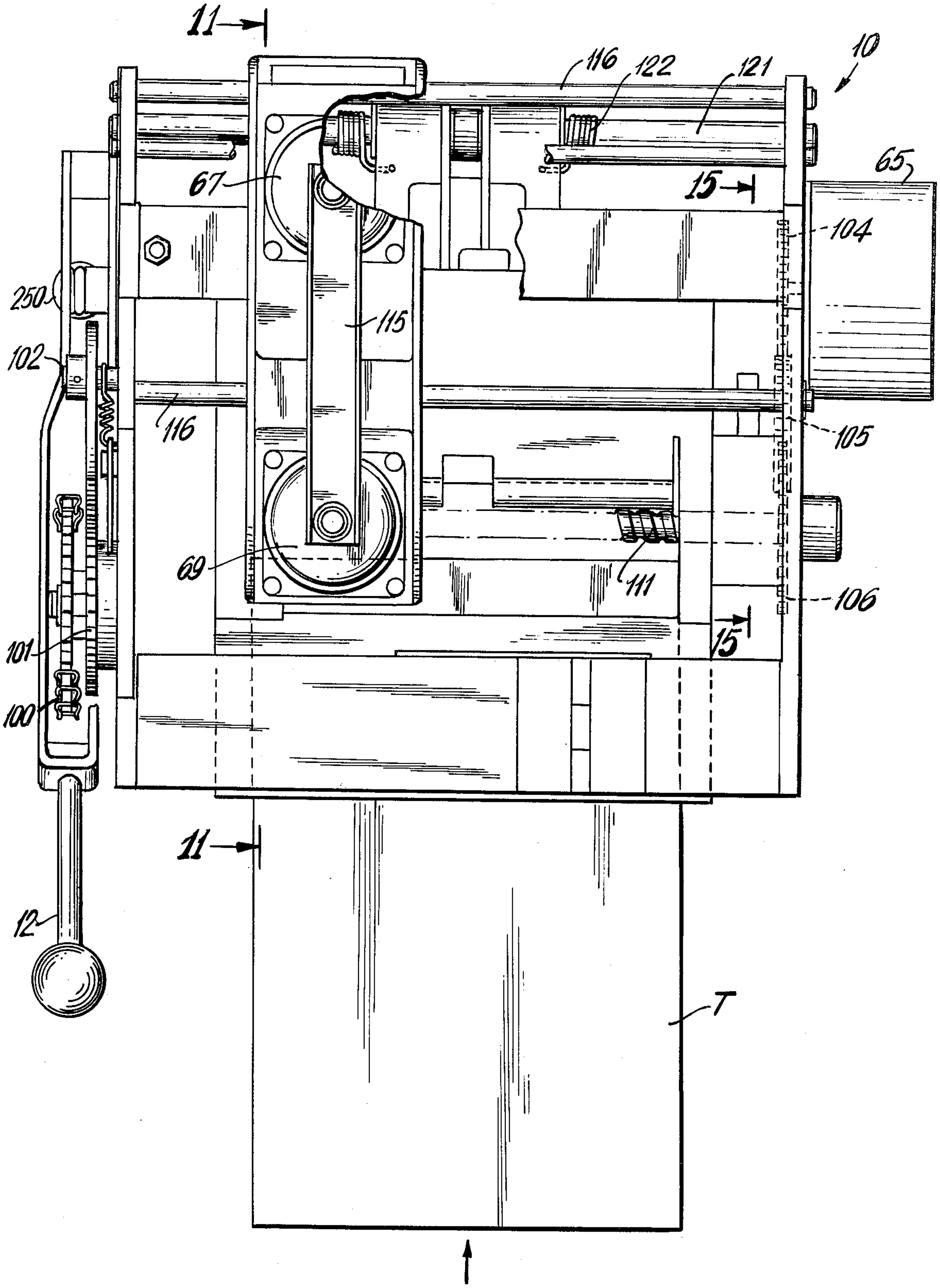
Figure 10:
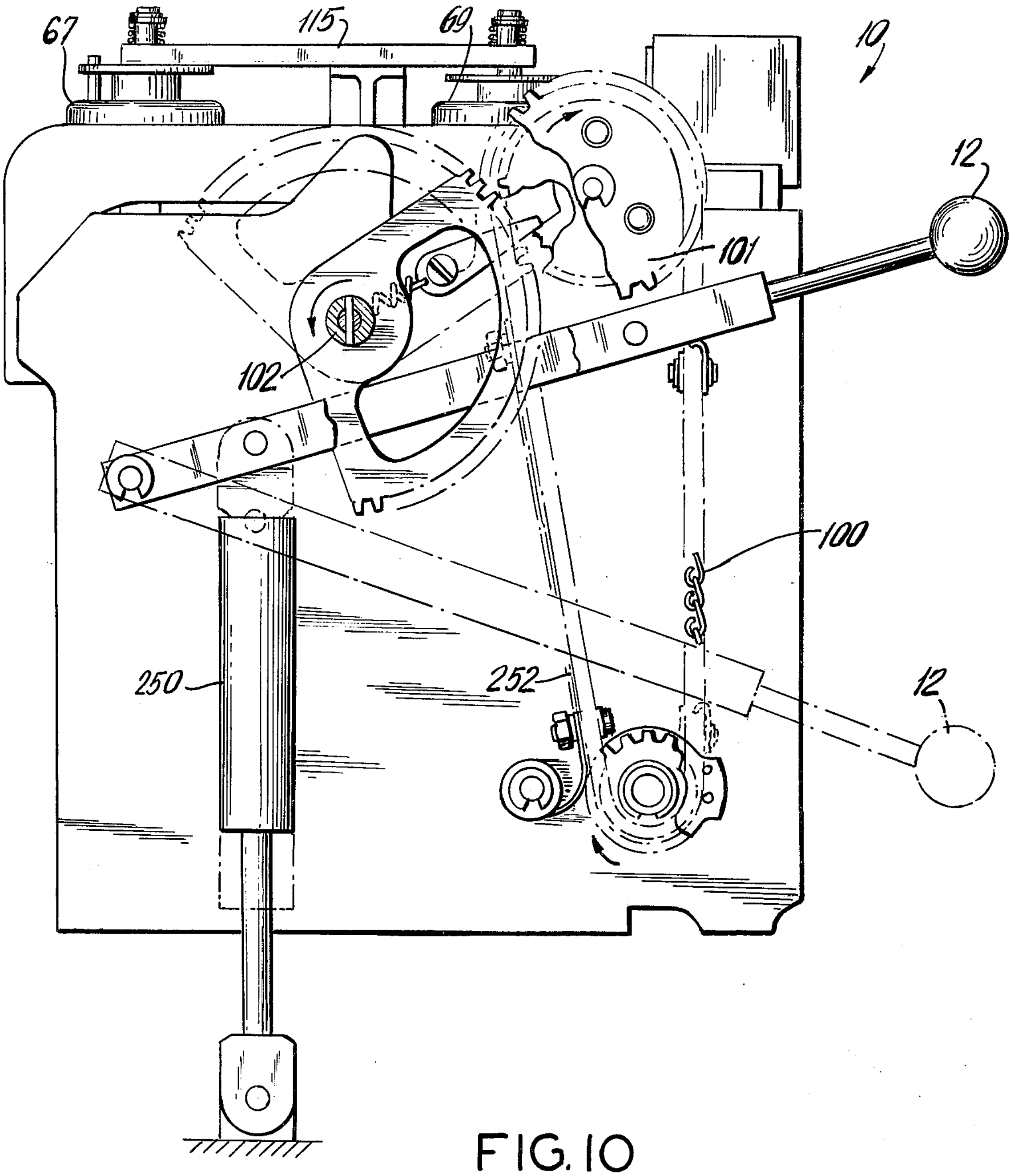

The FIG. 7 PRINT subroutine has been largely discussed above and this will not be repeated. It is simply observed for completeness that for functional block 210, the microprocessor 50 supplies a continuum of pulses to motor 65 to drive print wheel 110 and carriage 115 to the left margin. During functional block 212 the respective transaction number (TRANNΦ) gallons (GAL) and price per gallon (PPG) tax rates are printed in their respective fields. Similarly, the cost field is printed at 218. Test 215 examines the state of switch 80 at microprocessor 52-4 and prints tax in its predesignated field unless a tax rate is not desired in which case the "NΦ" exit of test 215 skips the tax printing operation (216).

The composite fuel delivery equipment discussed above and illustrated in the drawing has thus been shown to comprise complete, automated and secure equipment to supervise, control and record an entire fuel delivery operation in an improved, reliable manner.

The above-described arrangement is merely illustrative of the principles of the present invention. Numerous modifications and adaptations thereof will be readily apparent to those skilled in the art without departing from the spirit and scope of the present invention. As just one further example of improved reliability, projecting pawls or fingers 254 may protrude into the opening 258 of ticket tray 11 and to be biased away from the tray 11 into housing wall 255 slot 257 when the ticket tray is in its extended (FIG. 11) position only. This will visibly score the ticket if anyone attempts to remove the ticket when the tray 11 is otherwise than fully extended. The existence of such score marks provide additional customer verification and confidence in the overall delivery operation.

What is claimed is:

1. In combination in product metering apparatus, microprocessor means including instruction and read and write memory means, an invoice tray, a print wheel, print wheel driving means, product flow measuring means, plural input means connected to said microprocessor means including product cost rate register means, tray position signalling means, print wheel position signalling means, and said fuel flow measuring means, plural output means connected and responsive to said microprocessor means including said print wheel driving means and print actuating means, said microprocessor means including means for accumulating the product dispensed signalled by said product flow measuring means as an accumulation in said read and write memory means, means for storing the contents of said product cost rate register means in said memory means, means for energizing said print wheel drive means for traversing said print wheel across said invoice tray while rotating said print wheel, and means for selectively activating said print actuating means for outputting a record of the value of the product dispensed determined as the product of said contents of said product cost rate register means stored in said memory means and said accumulated dispensed product value.

2. A combination as in claim 1 wherein said print wheel driving means includes a lead screw and means for rotating said print wheel about said lead screw, said print wheel having threaded means for engaging said lead screw.

3. A combination as in claim 2 wherein said print wheel has numerical characters about the periphery thereof.

4. A combination as in claim 3 wherein said characters about said print wheel periphery are axially skewed.

5. In combination in product metering apparatus, microprocessor means including instruction and read and write memory means, an invoice tray, a print wheel, print wheel driving means, product flow measuring means, plural input means connected to said microprocessor means including product cost rate register means, tray position signalling means, print wheel position signalling means, and said fuel flow measuring means, plural output means connected and responsive to said microprocessor means including said print wheel driving means and print actuating means, said microprocessor means including means for accumulating the product dispensed signalled by said product flow measuring means as an accumulation in said read and write memory means, means for storing the contents of said product cost rate register means in said memory means, means for energizing said print wheel drive means for traversing said print wheel across said invoice tray while rotating said print wheel, and means for selectively activating said print actuating means for outputting a record of the value of the product dispensed determined as the product of said contents of said product cost rate register means stored in said memory means and said accumulated dispensed product value, wherein said print wheel driving means includes a lead screw and means for rotating said print wheel about said lead screw, said print wheel having threaded means for engaging said lead screw, wherein said print wheel has numerical characters about the periphery thereof, wherein said characters about said print wheel periphery are axially skewed, wherein said character skewing is by an amount such that all characters are presented at substantially the same longitudinal position for one rotation of said print wheel about said lead screw.

6. A combination as in claim 2 or 5 wherein said print actuating means comprises a carriage coupled to longitudinally translate with said print wheel, and a print solenoid secured for movement with said carriage.

7. A combination as in claims 1, 2 or 5 wherein said input means connected to said microprocessor further comprises reset means, and interrupt means for disabling an operative cycle of operation if power is applied to said apparatus with said invoice tray in other than a cleared position.

8. A combination as in claims 1, 2 or 5 wherein said input means connected to said microprocessor further comprises tax rate, tax mode and transaction registers, and wherein said print actuating means outputs the tax values for a transaction.

9. A combination as in claims 1, 2 or 5 wherein said input means connected to said microprocessor further comprises a time-out mode actuation switch, and further comprising means for effecting final data outputting via said print activating means responsive to an excessive time elapsing between consecutive signals from said product flow measuring means.

10. A combination as in claims 2 or 5 further comprising first securing means for securing said invoice tray in a fully inserted position, second securing means for securing said invoice tray in an intermediate position, reset means for inserting said invoice tray to a fully inserted position to be engaged by said first securing means, and means for selectively disabling said first securing means such that said tray becomes engaged by said second securing means and for disabling said second securing means such that said tray is fully extended.

* * * * *